United States Patent [19]

Tole

[11] Patent Number: 4,931,658
[45] Date of Patent: Jun. 5, 1990

[54] METHOD AND APPARATUS FOR DIMENSIONAL MEASUREMENT OF AN OBJECT

[75] Inventor: Walter R. Tole, Chinnor, England

[73] Assignee: Beta Instrument Co., Ltd., Bucks, England

[21] Appl. No.: 317,119

[22] Filed: Feb. 28, 1989

Related U.S. Application Data

[63] Continuation of Ser. No. 49,899, May 15, 1987, abandoned.

[30] Foreign Application Priority Data

May 15, 1986 [GB] United Kingdom ................. 8612038

[51] Int. Cl.⁵ ..................... G01N 21/86; G01B 11/10; H04N 7/18
[52] U.S. Cl. .................................... 250/560; 356/386; 358/107
[58] Field of Search ....................... 250/560, 561, 558; 356/384, 385, 386, 387, 390, 448; 358/107

[56] References Cited

U.S. PATENT DOCUMENTS

| | | | |
|---|---|---|---|
| 3,761,182 | 9/1973 | Kubisiak et al. | 356/387 |
| 3,897,156 | 7/1975 | Chasson | 250/560 |
| 4,152,767 | 5/1979 | Laliotis | 250/560 |
| 4,461,575 | 7/1984 | Miller, Jr. et al. | 250/560 |
| 4,499,383 | 2/1985 | Loose | 250/560 |
| 4,772,128 | 9/1988 | Vinarub et al. | 250/560 |

FOREIGN PATENT DOCUMENTS 0018403 1/1984 Japan ................... 356/379

*Primary Examiner*—David C. Nelms
*Assistant Examiner*—Michael Messinger
*Attorney, Agent, or Firm*—Mason, Fenwick & Lawrence

[57] ABSTRACT

The apparatus disclosed includes at least two optical measuring devices for forming independent images of the object in their respective focal planes. From these images a specific dimension of the object, for example its diameter where a circular object is concerned, may be obtained. To correct for inaccuracies due to product movement, the dimension of the product obtained from one of the measuring devices is compensated by a positional measurement obtained from the other camera and vice versa. By this means accurate determination of the size of a product, for example a cable moving in an extrusion run, is possible without contact being necessary within the product.

6 Claims, 2 Drawing Sheets

METHOD AND APPARATUS FOR DIMENSIONAL MEASUREMENT OF AN OBJECT

This application is a continuation of application Ser. No. 049,899 filed May 15, 1987, abandoned.

FIELD OF THE INVENTION

The present invention relates to a method and apparatus for the measurement of the dimensions of an object.

BACKGROUND ART

In various continuous processes, it becomes desirable to measure the external dimensions of the objects being produced in a continuous format, and in this context various systems and apparatus have been devised to perform this duty.

The continuous processes with which the present invention is particularly concerned are extrusion processes for producing wire, cable and the like. However dimensional measurement may also be required in other processes such as those for glass tube or rod manufacture, or even in precision component manufacture.

The basic need to measure object dimension in these processes is to ensure that the product being manufactured conforms to specification, in terms of the eventual use to which it is to be applied where critical tolerances are essential.

A second reason is one of economy and this applies to the extrusion of plastic covered products where a minimum coating requirement has to be fulfilled to avoid excess coating going to waste.

Existing methods are based on a shadow graph or scanning principle, which either looks at the shadow of an object or scans the object and hence obtains a measurement of the overall size. These existing systems suffer from inaccuracies resulting from the object moving with respect to the measuring apparatus itself.

Object movement creates errors since this is interpreted falsely by the measuring instrument as a size change. This inherent difficulty has been overcome in some cases by guiding and restraining movement of the product through the measuring apparatus. This arrangement has had some but limited success.

Thus where the product is either too hot or too soft, the mechanical guidance system employed is liable to deform the product or render it useless.

SUMMARY OF THE INVENTION

It is an object of the invention to obviate the problems of the prior art.

According to the invention there is provided apparatus for determining a dimension of an object comprising a source of radiation for directing at the object, a first optical head for forming an image of the object in relation to a first optical axis passing through the object and providing an output representative of the size and position of the image in a focal plane of the first optical head, a second optical head for forming an image of the object in relation to a second optical axis passing through the object and providing an output representative of the size and position of the image in a focal plane of the second optical head, and means for correlating said outputs of the first and second heads such that a dimensional measurement of the image obtained from the output of one of said first and second heads is compensated for object movement by a positional measurement of the image obtained from the output of the other of said first and second heads whereby to determine an accurate measure of a dimensional of the product represented by the image.

Other features and advantages of the invention will become apparent to the skilled reader as the invention is further described in relation to specific ways and means of putting same into effect.

BRIEF DESCRIPTION OF THE DRAWINGS

An embodiment of the invention will now be described by way of example with reference to the drawings wherein.

Figure 1:
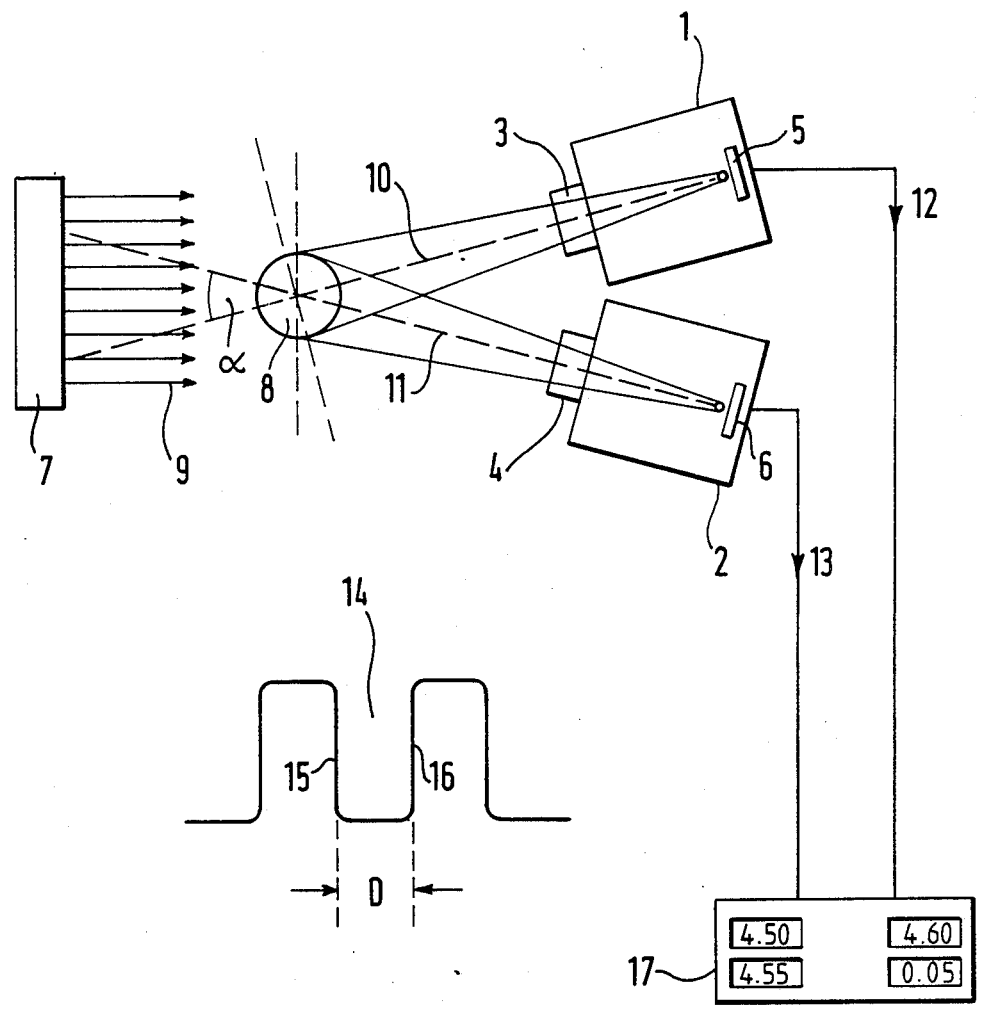
FIG. 1 is a diagrammatic illustration of measuring apparatus according to the invention.

The measuring apparatus shown in FIG. 1 comprises a pair of optical measuring heads 1 and 2.

The optical heads 1 and 2 operate essentially on the camera principle and include lenses 3 and 4 which act to focus an image of the perceived object on light responsive devices within the heads 1 and 2 in the form of charge coupled devices (CCD's) 5 and 6.

The object to be measured, in for the form of extruded cable 8, in this example, passes between the heads 3 and 4 and radiation source 7, to intercept the radiation beam 9.

The heads 1 and 2 are arranged such that their respective optical axes 10 and 11 intercept or meet one another at the centre of the cable 8 as shown.

Consequently a real image of the object 8 is formed on the radiation responsive devices 5 and 6 in the heads 1 and 2.

In the example shown the optical axes 10 and 11 are at an acute angle $\alpha$ with respect to one another but in practice this angle may be of a value within say a range of 20° to 90°, but is not critical.

Figure 2:
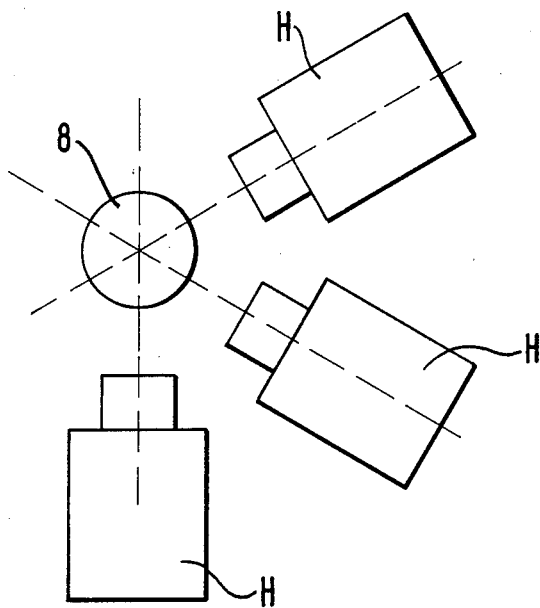
FIG. 2 is a diagrammatic representation of a measuring apparatus according to another embodiment of the invention.

The outputs 12 and 13 from the CCD 5 and 6 in each optical head 1 and 2 may be represented in electrical wave form on an oscilloscope as shown in FIG. 2.

It will be appreciated that the valley 14 represents the radiation which is obscured by the real image of the object 8 falling on the CCD's 5 and 6.

Hence the distance D between the sides 15 and 16 of the output pulses 17 and 18 of the waveform is a measure of the diameter of the product 8 passing along the extrusion line. By measuring this distance D by suitable electronic circuitry, it is possible accurately to determine the dimension (for example diameter) of the cable product 1.

It is to be noted that this dimension measured simultaneously by optical heads 1 and 2, is that diameter of the object 8 perpendicular to the respective optical axes 10 and 11 of the heads 1 and 2.

If the object 8 moves in space, for example towards the head 1, the real image formed on the radiation responsive device 5 will increase in size, since this image size is a function of the distance of the object 8 from the device 3.

Similarly if the object 8 moves away from the head 1, the image formed on the CCD 5 will decrease in size.

Consequently if reliance were placed entirely on the measurement of product size being obtained with a single optical head 1 or 2, there would be inherent inaccuracies brought about by product movement, as discussed earlier in this disclosure.

When the object 8 moves towards head 1, the head 2 will detect a change in size of the real image of the object 8 which will be a function of the angle $\alpha$ between the optical axis 10 and 11 of the heads 1 and 2.

The radiation responsive devices 5 and 6 will detect this change in image size, and signals representative thereof are fed to an indicator unit 17.

By cross relating the output of one radiation responsive device 3 with the other 4 in the indicator unit 17, it is possible by suitable electronic circuitry in the indicator unit 17, including microprocessor means to compensate for the movements of the product 1 and obtain an accurate value of its diameter.

This arrangement thereby clearly obviates the need to guide the product to prevent movement as has been necessary heretofore. The present invention therefore provides a truly non-contact measurement technique with minimum error.

As mentioned earlier the angle $\alpha$ between the two heads 1 and 2 is not critical and could be anything from 20° up to 90° depending on the configuration, application and requirement of the measurements to be made.

Considering a theoritical example to highlight the above, we may consider a practical situation where an image of the profile of the object 8 is projected onto the CCD's 5 and 6 of the measuring heads 1 and 2. In this example the CCD is a 12.70 mm 1024 pixel array.

Figure 3:
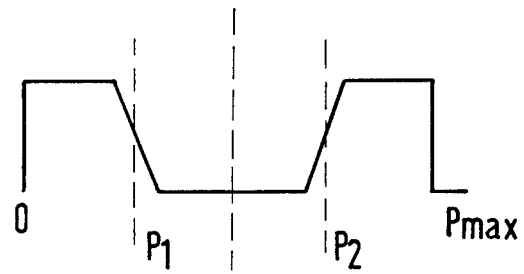
FIG. 3 is a wave form output obtained from the apparatus of FIG. 1.

The profile is illuminated from behind as shown in FIG. 1, so that the image is represented by no light reaching the array as shown with reference to FIG. 3.

Now:

$$\text{Image size } I \text{ (in either devices 1 or 2)} = \frac{12700(P_2 - P_1)}{1024} \text{ microns} \quad (1)$$

$$\text{Image position } P \text{ (in either devices 1 or 2)} = \frac{(P_1 + P_2 - P_{max})}{2}\left(\frac{12700}{1024}\right) \quad (2)$$

Assuming simple geometrical optics $$\frac{\text{Object height }(D)}{\text{Image height }(I)} = -\frac{u}{v} \begin{array}{l}\text{(object distance)}\\ \text{(image distance)}\end{array} \quad (3)$$

But $\frac{1}{f} = \frac{1}{u} + \frac{1}{v}$ where f=local length of lenses 3 and 4.
Therefore $$\frac{1}{v} = \frac{u - f}{uf} \quad (4)$$

and therefore from (3)

$$\text{Object height } D = \frac{I(u - f)}{f} \quad (5)$$

Now consider the case where the angle $\alpha$ in FIG. 1 is 90°.

The nominal distance from the camera lenses 3 and 4 to the circular object 8 are $U_{xnom}$ and $U_{ynom}$ and the mean image positions detected by devices 1 and 2 are $P_x$ and $P_y$, where the suffix "x" and "y" refer to devices 1 and 2 respectively.

Therefore $$U_x = U_{xnom} + P_y \quad (6)$$

$$U_y = U_{ynom} + P_x \quad (7)$$

Substituting equations (6) and (7) in equation 5 in respect of both optical devices 1 and 2 we have $$D_x = \frac{12700(P_2 - P_1)_x}{1024} \frac{(U_{xnom} + P_y - f)}{1000f} \text{ mm} \quad (8)$$

and $$D_y = \frac{12700(P_2 - P_1)_y}{1024} \frac{(U_{ynom} + P_x - f)}{1000f} \text{ mm} \quad (9)$$

where $D_x$ is the corrected image size in device 1 and $D_y$ is the corrected image size in device 2.

$U_{xnom}$ and $U_{ynom}$ are entered according to the configuration of the system. They may be finely adjusted in order to calibrate the instrument against a fixed sample. It will be assumed that the camera devices 1 and 2 will be focused for $U_{xnom}$ and $U_{ynom}$.

If the devices 1 and 2 are mounted so that their lines of sight are at an angle $\alpha$ to each other, as shown in FIG. 1, the object position may still be compensated as follows:

In this case equations (6) and (7) become:

$$U_x = U_{xnom} + P_y \cos \alpha$$

$$U_y = U_{ynom} + P_x \cos \alpha$$

The allowable movement is reduced in proportion to $\cos \alpha$.

The invention, as shown in FIG. 2, may be extended in some applications to having a multiplicity of heads H, say four or five, around the product 8 in order to effect more dimensional measurements and extract more information which may be required in the process of manufacturing elongated products. This method and apparatus lends itself suitable for not only measuring the dimension of the product but is also suitable for measuring small surface imperfections that may occur during the manufacture of various types of materials and as the product is viewed from a multiplicity of heads an analysis may be made of the surface quality of the product.

I claim:

1. Apparatus for determining a transverse dimension of a linearly extending longitudinal object moving continuously in a direction of travel along its longitudinal axis without restraint to movement in any direction transverse to its direction of travel, comprising:

first optical head means having a focal plane and a first optical axis passing through the linearly extending longitudinal object for continuously forming an image of the object in relation to said first optical axis and providing a continuous output representative of the size and position of the image in said first focal plane;

second optical head means having a focal plane and a second optical axis passing through the linearly extending longitudinal object and intersecting said first optical axis within the object for continuously forming an image of the object in relation to said second optical axis and providing a continuous output representative of the size and position of the image in said second focal plane;

moving means for moving the linearly extending longitudinal object in a direction of travel along its longitudinal axis past said first and second head means without restraint of the object to movement in any direction transverse to its direction of travel; and correlating means for continuously correlating said continuous outputs of said first and second optical head means for continuously compensating for movement of the linearly extending longitudinal object in any direction transverse of its direction of travel and for making a continuous transverse dimensional measurement of the image obtained from the continuous output of one of said first and second optical head means by a positional measurement of the image obtained from the output of the other of said first and second optical head means for determining a continuous accurate measure of a transverse dimension of the linearly extending longitudinal object represented by the image.

2. Apparatus as claimed in claim 1 wherein the object is substantially circular, said continuous transverse dimensional measurement of the image being the diameter of the object.

3. Apparatus as claimed in claims 1 or 2 wherein said continuous positional measurement is the mean position of the image and a respective focal plane of said first or second optical head means.

4. Apparatus as claimed in claim 1 wherein said continuous outputs are provided by charge coupled devices respectively positioned at said first and second focal planes of said first and second optical head means.

5. Apparatus as claimed in claim 4 wherein said correlating means includes processor means for continuously processing the outputs of said charge coupled devices to calculate said accurate dimension of the object.

6. A method of determining a transverse dimension of a linearly extending object comprising the steps of:

moving said linearly extending longitudinal object continuously in a direction of travel along its longitudinal axis without restraint to movement in any direction transverse to its direction of travel;

continuously directing a beam of radiation at the longitudinally moving linearly extending longitudinal object;

continuously forming a first image of the longitudinally moving linearly extending longitudinal object in the beam in relation to a first optical axis passing through the object;

continuously forming a second image of the longitudinally moving linearly extending longitudinal object in the beam in relation to a second optical axis passing through the object and intersecting the first optical axis within the object;

obtaining a continuous transverse dimensional measurement of the longitudinally moving linearly extending longitudinal object derived from one of the first and second images;

obtaining a continuous positional measurement of the longitudinally moving linearly extending longitudinal object derived from the other one of the first and second images; and continuously correcting for inaccuracies in the transverse dimensional measurement due to movement of the longitudinally moving linearly extending longitudinal object in any direction transverse of its direction of travel using the continuous positional measurement.

* * * * *